UNITED STATES PATENT OFFICE.

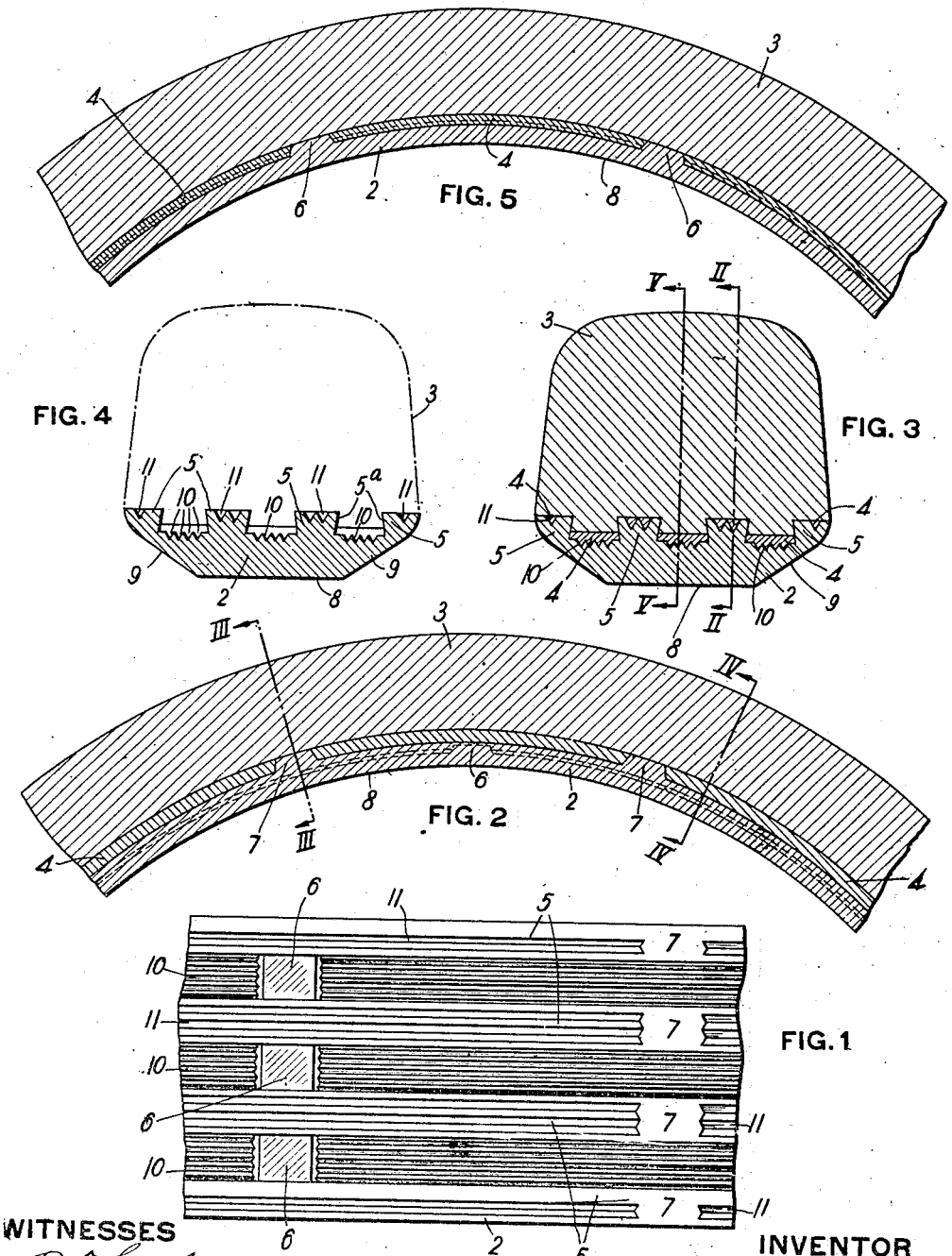

THOMAS HIGGINS, OF PITTSBURGH, PENNSYLVANIA.

METAL TIRE-BAND.

1,091,573.  Specification of Letters Patent.  Patented Mar. 31, 1914.

Application filed May 16, 1912.  Serial No. 697,641.

*To all whom it may concern:*

Be it known that I, THOMAS HIGGINS, a citizen of the United States, residing at Pittsburgh, in the county of Allegheny and State of Pennsylvania, have invented a new and useful Metal Tire-Band, of which the following is a specification.

My invention relates to the construction of metal tire bands for the wheels of vehicles and more particularly relates to the construction of the metal tire bands of the class used in making wheels in which rubber tires are fastened to the metallic tire bands.

One object of my invention is to provide a tire band of improved construction having novel means on the surfaces thereof engaging with the rubber tire whereby the rubber tire is more securely fastened to the tire band and by which creeping or relative angular axial movement of the rubber tire and the tire band is prevented and overcome.

Referring to the accompanying drawings forming part of this specification, Figure 1 is a plan on an enlarged scale showing the outer or top surface of a multiple length tire band as rolled in accordance with my invention. Fig. 2 is a sectional side elevation showing a portion of the tire band as formed when mounted on a wheel having a rubber tire secured in place thereon, the section being taken on the line II—II of Fig. 3. Fig. 3 is a transverse section of the tire band having a rubber tire thereon, the section being taken on the line III—III of Fig. 2. Fig. 4 is a section similar to that in Fig. 3, taken on the line IV—IV of Fig. 2, the rubber tire being shown in outline in broken lines. Fig. 5 is a sectional side elevation similar to that shown in Fig. 2, the section being taken on the line V—V of Fig. 3.

In the drawings, the numeral 2 designates the tire band as constructed in accordance with this invention, having a rubber tire 3 secured in place thereon, the tire being secured to the metal tire band by cement or similar adhesive 4.

As will be seen from the drawings, the outer surface of the tire band is provided with a series of longitudinal ribs 5, and transverse ribs 6. The ribs 5 are intersected by the transverse ribs 6 so as to form a series of independent depressions which are separated from each other. The top surfaces of the ribs 5 and 6, in the tire band as rolled are not of the same height, the ribs being somewhat less in height than the ribs 5 with which they intersect at intervals in the length of the rolled, multiple length tire bands. The inner surface of the tire band at the completion of the rolling operation is formed by an intermediate flat portion 8 and by side portions 9, 9 which are angular and which taper upwardly and outwardly from the intermediate flat portion 8 of the inner surface of the tire band. The bottom surfaces of the depressions formed in the outer surface of the tire band between the ribs 5 by the ribs 6 are provided with a series of V-shaped grooves 10 which extend lengthwise parallel to the longitudinal ribs 5 between the transverse ribs 6. The outer surfaces of the longitudinal ribs 5 also are provided with V-shaped grooves 11 which extend lengthwise parallel to the longitudinal ribs 5 the continuity of these V-shaped indentations being interrupted at intervals by the transverse ribs 7. The transverse ribs 7 are staggered with respect to the ribs 6 and extend outward to the surface of the longitudinal ribs 5 so as to be of the same height, while the ribs 6 are of a height equal to about one-half the depth of the depressions. Pieces of the so-formed tire bands, between the longitudinal ribs 5. The side surfaces 5ª of the longitudinal ribs 5 are inclined upwardly and inwardly so the recesses or depressions are dovetailed in cross section to receive the tongues on the rubber tires. Pieces of the so-formed tire bands, which are rolled in multiple lengths are cut to length and their ends united to form annular rings of the desired diameter, the inner surface of the so-formed rings being arranged to be detachably secured on the wheels on which they are mounted.

In forming the detachable tires the rubber tire is secured to the tire band by means of cement which fills the V-shaped grooves in the bottom surface of the depressions and in the surface of the longitudinal ribs 5, in this way materially increasing the surface of the tire band in engagement with the cement.

The side surfaces of the depressions in the tire band being tapered so as to form dovetails in cross section assist in firmly holding the rubber tire in place on the tire band, and the transverse ribs 6 by engagement with the end of the projections on the rubber tire extending into the depressions, prevent creeping or relative angular movement axially of the rubber tire and tire band.

Modifications in the construction of the tire bands forming my invention may be made without departing from the invention, as defined in the claims. The length and width of the depressions formed between the longitudinal ribs may be varied, the size and number of the V-shaped grooves in the bottom surface of the depressions and in the surface of the longitudinal ribs, may be changed. The cross section of the tires may be changed and other variations may be made.

I claim:—

1. A tire band comprising a flat metal band having longitudinal and transverse ribs forming a series of separated independent depressions in one surface thereof, and a plurality of longitudinally extending V-shaped grooves in the bottom surface of said depressions.

2. A tire band comprising a flat metal band having longitudinal and transverse ribs forming a plurality of rows of separated independent depressions in one surface thereof, and a plurality of parallel longitudinally extending V-shaped grooves in the longitudinal ribs and bottom surface of said depressions.

3. A tire band comprising a flat metal band having longitudinal and transverse ribs forming a plurality of rows of separated independent depressions in one surface thereof, and a plurality of longitudinally extending V-shaped grooves in the bottom surface of said depressions, the transverse ribs forming the depressions being staggered relatively to the transverse ribs on the outer surfaces of the longitudinal ribs.

4. A tire band comprising a flat metal band having longitudinal and transverse ribs forming a plurality of rows of separated independent depressions in one surface thereof, a plurality of longitudinally extending V-shaped grooves in the bottom surface of said depressions, and a plurality of parallel V-shaped longitudinal grooves at separated intervals in the length of the longitudinal ribs of said tire band.

5. A tire band comprising a flat metal band having longitudinal and transverse ribs forming a plurality of rows of separated independent depressions in one surface thereof, the depressions in one row being staggered relatively to those in the adjacent rows, and at least one V-shaped longitudinally extending groove in each of said longitudinal ribs.

6. A tire band comprising a flat metal band having longitudinal and a plurality of sets of transverse ribs forming a plurality of rows of separated independent depressions in one surface thereof, the transverse ribs forming the depressions between the longitudinal ribs being staggered relatively to the transverse ribs on the outer surface of the longitudinal ribs.

7. A tire band comprising a flat metal band having longitudinal and transverse ribs forming a plurality of rows of separated independent depressions in one surface thereof, and a plurality of parallel V-shaped longitudinal grooves at separated intervals in the length of the longitudinal ribs of the tire band.

In testimony whereof, I have hereunto set my hand.

THOMAS HIGGINS.

Witnesses:
C. W. DAVISON,
J. A. SCOTT.